(12) United States Patent
Niemczyk et al.

(10) Patent No.: US 7,839,790 B2
(45) Date of Patent: Nov. 23, 2010

(54) NETWORK CONGESTION ANALYSIS

(75) Inventors: Steve Niemczyk, Bethesda, MD (US); Patrick J. Malloy, Washington, DC (US); Alain J. Cohen, McLean, VA (US); Russell Mark Elsner, Bethesda, MD (US)

(73) Assignee: OPNET Technologies, Inc., Bethesda, MD (US)

( * ) Notice: Subject to any disclaimer, the term of this patent is extended or adjusted under 35 U.S.C. 154(b) by 467 days.

(21) Appl. No.: 11/776,736

(22) Filed: Jul. 12, 2007

(65) Prior Publication Data

US 2008/0019278 A1 Jan. 24, 2008

Related U.S. Application Data

(60) Provisional application No. 60/807,247, filed on Jul. 13, 2006, provisional application No. 60/916,842, filed on May 9, 2007.

(51) Int. Cl.
H04L 12/56 (2006.01)

(52) U.S. Cl. ............... 370/238; 370/231; 370/236; 709/224; 709/235

(58) Field of Classification Search .......... 370/235, 370/236, 230, 238, 345; 709/235, 238, 241, 709/224

See application file for complete search history.

(56) References Cited

U.S. PATENT DOCUMENTS

| | | | |
|---|---|---|---|
| 5,995,488 A * | 11/1999 | Kalkunte et al. ........... 370/232 |
| 6,393,480 B1 | 5/2002 | Qin et al. | |
| 6,735,553 B1 * | 5/2004 | Frogner et al. ............ 702/186 |
| 6,760,309 B1 * | 7/2004 | Rochberger et al. ........ 370/235 |
| 6,801,940 B1 | 10/2004 | Moran et al. | |
| 7,130,915 B1 | 10/2006 | Rustad | |
| 7,133,911 B1 | 11/2006 | Schaffer et al. | |
| 2003/0033394 A1 * | 2/2003 | Stine ........................ 709/222 |
| 2004/0151114 A1 * | 8/2004 | Ruutu ....................... 370/230 |
| 2006/0007863 A1 * | 1/2006 | Naghian .................... 370/238 |
| 2006/0092850 A1 * | 5/2006 | Neidhardt et al. .......... 370/252 |
| 2007/0121506 A1 * | 5/2007 | Wydrowski et al. ........ 370/231 |

\* cited by examiner

Primary Examiner—Ricky Ngo
Assistant Examiner—Rasheed Gidado
(74) Attorney, Agent, or Firm—Robert M. McDermott, Esq.

(57) ABSTRACT

Application messages are segregated into message paths, and the delays of the transmitted packets associated with each message path are independently analyzed to distinguish propagation, bandwidth, congestion, and protocol delays. To further distinguish the congestion delays, all of the paths of the application messages are assessed to identify delays induced by the application, including self-congestion delay, corresponding to pre-congestion delays caused by attempting to send data from a source device faster than the bandwidth of the channel allows, and cross-congestion delay, corresponding to post-congestion delays caused by varying delays beyond a bottleneck link in the channel. The remaining congestion delay is identified as network congestion delay, corresponding to delays caused by network devices other than the source device. After identifying each of the components of delay, the effect of each component on the overall delay is determined to identify where improvements can best be made.

40 Claims, 6 Drawing Sheets

NETWORK CONGESTION ANALYSIS

This application claims the benefit of U.S. Provisional Patent Applications 60/807,247, filed 13 Jul. 2006 and 60/916,842, filed 9 May 2007.

BACKGROUND AND SUMMARY OF THE INVENTION

This invention relates to the field of network systems, and in particular to an analysis method and system that distinguishes congestion and other delays that occur during the communication of messages across a network.

Proper management of a network generally requires assuring that the network is performing satisfactorily for the users of the network, modifying the network to address performance issues or problems, and planning for future improvements to the network as demand increases and as newer technologies and alternatives become available.

A variety of tools have been developed, and continue to be developed, to facilitate the management of communication networks, and in particular for managing networks that provide communications among computer devices. Many of these tools are configured to model the network's performance under a variety of traffic conditions, both real and hypothesized, and in many cases, base this performance on data collected from the actual network.

One of the primary parameters for analyzing or assessing the performance of a network is the time it takes for messages to reliably reach their destination. This time is dependent upon a variety of factors. The message is typically partitioned into transmission elements, herein termed packets for convenience. Each packet must enter the network, and incurs a delay as it gains network access. When it enters the network, it incurs a delay that is dependent upon the bandwidth available at each link along its path to its destination. It may also incur queuing delays as it passes through intermediate nodes, particularly at congested links. Upon arrival at the receiving node, a delay may also be incurred as the proper receipt of the message is verified. Some of these factors are constant, while others vary over time, typically dependent on network loading.

The effectiveness of a network analysis system is based on a number of factors, one of which is the system's ability to distinguish the variety of causes of message delay, and another is the system's ability to assess the effect of potential network modifications on each of these classes of delay. Although some causes of delay are relatively straightforward to distinguish into defined classes, such as "bandwidth delay" and "propagation delay", many other causes are often indistinguishable and are included in a general class of "protocol/congestion delays". As such, little guidance is provided for identifying potential network modifications beyond modifications that address reducing the bandwidth delay at identified 'bottlenecks' of the network.

It would be advantageous to be able to distinguish among the causes of delay whose effects are generally classified as protocol/congestion delays. It would also be advantageous to distinguish delays that are actually caused by congestion from other causes of delay. It would also be advantageous to identify an amount of reduction in delay that may be achieved by reducing each distinguished cause of delay.

These advantages, and others, can be realized by a method and system that distinguishes between congestion and protocol delay, as well as bandwidth and propagation delay. Application messages are segregated into message paths, and the delays of the transmitted packets associated with each message path are independently analyzed to distinguish propagation, bandwidth, congestion, and protocol delays. To further distinguish the congestion delays, all of the paths of the application messages are assessed to identify self-congestion delay, corresponding to pre-congestion delays caused by attempting to send data from a source device faster than the bandwidth of the channel allows, and cross-congestion delay, corresponding to post-congestion delays caused by varying delays after a bottleneck link of the channel. The remaining congestion delay is identified as network congestion delay, corresponding to delays caused by network devices other than the source device. After identifying each of the components of delay, the effect of each component on the overall delay is determined to identify where improvements can best be made.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Copending U.S. patent application Ser. Nos. 11/180,878, "PACKET TRACING", filed 13 Jul. 2005 for Malloy et al., 11/180,879, "CORRELATING PACKETS", filed 13 Jul. 2005 for Malloy et al., and 11/752,283, "ESTIMATION OF TIME-VARYING LATENCY BASED ON NETWORK TRACE INFORMATION", filed 22 May 2007 for Znamova et al., disclose techniques for determining the timing characteristics of communications among network devices and are each incorporated by reference herein. These references disclose techniques for distinguishing communications associated with particular applications, including techniques for associating individual packet communications to each message sequence initiated by the application.

Figure 1A:
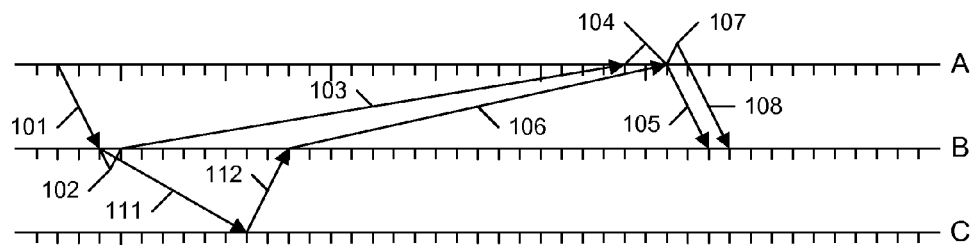
FIGS. 1A-1C illustrate an example partitioning of an application traffic flow into paths of packet flow.

FIG. 1A illustrates an example timing diagram of an application's message sequence. An arrow between the horizontal lines labeled A, B, and C illustrates the transmission of a message between a pair of nodes (A-B, B-C), the arrow head indicating the direction of transmission, and the slope of the arrow indicating the time required for the message to travel between the nodes. This time may include any number of delays, including network access delay, bandwidth delay, long-distance propagation delay, queuing delays at intermediate switches, and so on, as the message travels between the pair of nodes. A connection of the head of an arrow/message to the tail of a next arrow/message at the destination node generally indicates that the second message is in response to the first message; if a significant amount of time is consumed at a node before the response is transmitted, a connecting line, such as illustrated at 102, 104, 107 is used to indicate this processing at the node.

The example of FIG. 1A is illustrative of a typical application sequence for retrieving information from a remote database. The nodes A, B, and C indicate "tiers" of devices; in this example, node A represents a device at the 'client' tier, node B represents a device at the 'server' tier, and node C represents a device at the 'database' tier. The client A sends a request 101 to server B for data. The server B identifies data that it can provide directly, and data that database C can provide, and sends a request 111 to database C for this data. Server B then performs the processing 102 necessary to generate the data that it can provide directly, and transmits the data 103 to node A. Node A processes the data 104, and sends an acknowledgement 105 to server B. Concurrently, database C responds to the request 111, and sends the requested data 112 to server B; server B forwards this data 106 to client A; client A processes the data 107 and sends another acknowledgement 108 to server B, terminating the application sequence.

Figure 1B:
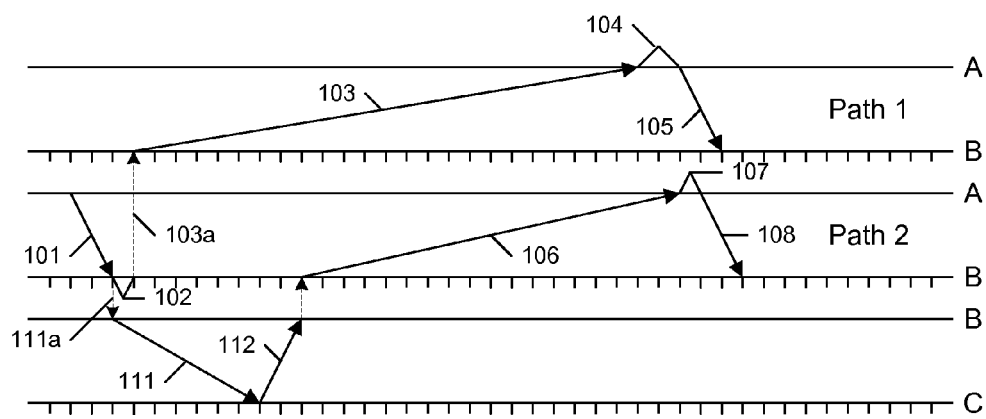

FIG. 1B illustrates the partitioning of the above described application sequence into two message paths. Path 1 represents the messages corresponding to the sequence of providing the data directly from server B (path 101-102-103-104-105), and Path 2 represents the sequence of providing the data from database C (path 101-111-112-106-107-108). Dashed vertical arrows, such as 103a, 111a, indicate the continuation of the path on different timing diagrams. Note that some communications, e.g. the request 101, may appear in multiple paths. Also note that the representation of FIG. 1B is provided for ease of illustration of some of the aspects of this invention; in many cases, the various message paths may not lend themselves to a simple layout.

Figure 1C:
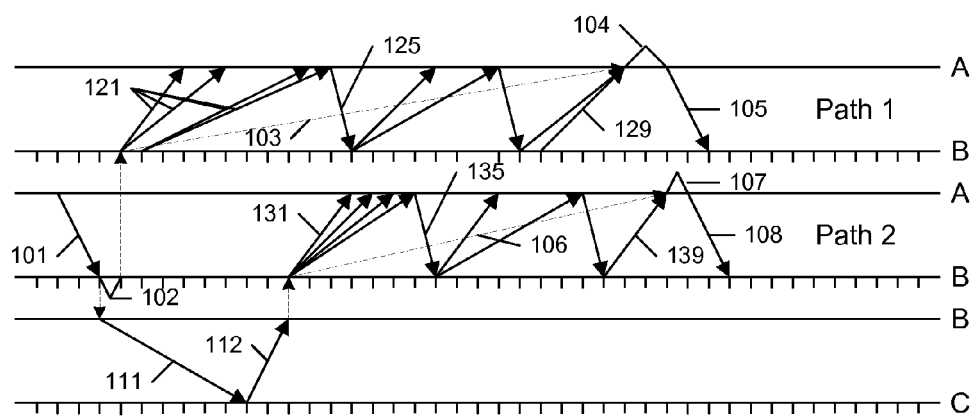

FIG. 1C illustrates an identification of each of the packets corresponding to the communications 103 and 106. That is, the transmission of the data from server B to client A, which is illustrated as a single message element 103 at the application level, comprises the communication of individual transmission elements, commonly termed packets. As illustrated, server B transmits four packets 121, then waits for an acknowledgement 125 from client A, and this transmit-acknowledge sequence continues until the last packet 129 is sent from server B. In like manner, server B sends the data from database C to client A as packets 131 that are systematically acknowledged 135 by client A until a last packet 139 is received from server B. (This packet 139 would typically also be acknowledged by client A, but this acknowledgement is omitted, for clarity, because it is not in the 'critical path' for determining delays at the application level.)

As can be seen in FIG. 1C, the delays associated with the transmission of each packet varies, as indicated by the various slopes of the arrows representing these transmissions. Although the first two packets 121 are transmitted as a single transmission from server B, they arrive at substantially different times, and although the next two packets 121 are transmitted within one time-unit of the first two packets, there is a four time-unit gap before they arrive at client A. In order to improve the performance of the network that provides the communications between client A and server B by reducing the delay in the transfers of data 103, 106, it would be advantageous to know the cause(s) of these varying delays.

Figure 2:
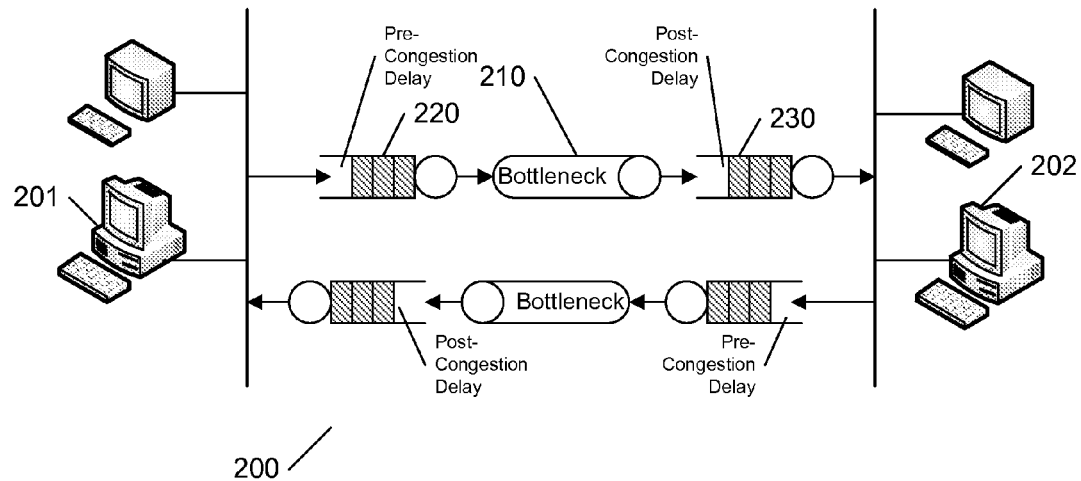
FIG. 2 illustrates an example delay model of traffic flow between nodes of a network.

FIG. 2 illustrates an example delay model for communications between nodes 201, 202 of a network 200. Although the details of the network 200 may be unknown, the flow of communications can be modeled as a flow through a bottleneck 210, wherein the bottleneck represents the segment of the network between the communicating nodes 201-202 having the least bandwidth. The flow of traffic is modeled in each direction, to allow for different delay effects in each direction. At the bottleneck 210, each packet will incur a 'bandwidth' delay that is equal to the size of the packet divided by the bandwidth associated with the bottleneck 210. If a packet is 50 KB in size, and the minimum bandwidth is 5 KB/second, it will take 10 seconds to transmit the packet across the link, because only 5 KB can be accepted by the link each second. Generally, this minimum bandwidth is specified by the network provider, or it may be estimated by simulation of a model of the network, or estimated based on historic data, or any combination of these and other known techniques.

Because this bottleneck has the minimum bandwidth, traffic that arrives from higher bandwidth links will typically incur a queuing delay 220 while waiting to traverse the bottleneck, the amount of delay being dependent upon the amount of other traffic (congestion) along the path to the bottleneck. Upon departing the bottleneck, other queuing delays 230 may be experienced as the packet encounters congestion at other links in the network. Although a single queue 220, 230 is illustrated on either side of the single bottleneck 210, one of skill in the art will recognize that these elements 210, 220, 230 are merely symbolic representations of the cumulative delay effects along the path between nodes 201 and 202.

In addition to the aforementioned delays caused by bandwidth and congestion, each packet incurs a latency delay that is equal to the time required to physically travel across the (electrical) distance between the nodes 201 and 202. Also, the transmission of the packet between the nodes 201 and 202 will encounter other delays that are not attributable to bandwidth, congestion, or latency, such as delays in gaining network access, delays waiting for acknowledgements, and so on. For ease of convenience, all of these other delays are commonly termed 'protocol' delays, because a primary cause of such delays is often related to adherence to protocols for effective communication.

In accordance with an aspect of this invention, the aforementioned latency, bandwidth, congestion and other/protocol delay components are determined for a given application message sequence, and, preferably, the congestion delay is further analyzed to distinguish cross-congestion and self-congestion components that the application sequence produces from network congestion caused by other traffic on the network.

Figure 3:
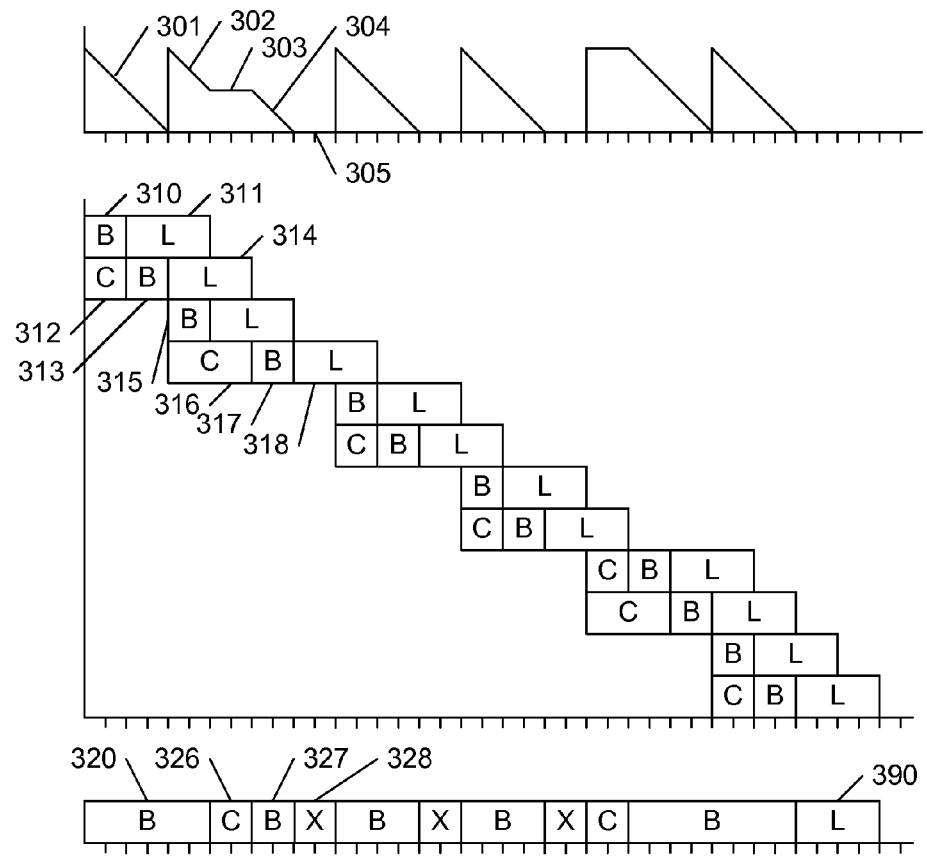
FIG. 3 illustrates an example determination of packet delay components that are realized at the message level.

FIG. 3 illustrates an example processing of a sequence of packets to identify delays that can be attributed to latency (L), bandwidth (B), congestion (C), and other/protocol (X). The latency (L) and bandwidth (B) are determinable based on the size of the packet, the (electrical) distance between the source and destination nodes, and the minimum bandwidth at the bottleneck. Once the packet is on the network, which is where the timing characteristics are typically determined, the only other delay in the transmission of the packet is assumed to be attributed to congestion delay (C).

The default delay model of this invention assumes that the latency delay (L) of each packet occurs last, preceded by the packet's bandwidth delay (B), and therefore the congestion delay (C) occurs first, consistent with the assumption that the bottleneck link is the primary cause of congestion delays while the packet waits to travel through this minimum bandwidth link. As discussed further herein, this arrangement of congestion-before-bandwidth delay is subject to change if the analysis of the delays indicates otherwise. Using this default model, and recognizing that the bottleneck link may be located anywhere within the network, the following description of the delays of FIG. 3 is presented using the paradigm of the transmitter's output queue forming the bottleneck queue (220 of FIG. 2) for output from this transmitter.

The upper timing diagram is intended to illustrate the transmitter output queue, i.e. the amount of data available to be transmitted. The middle timing diagram illustrates a "Gantt Chart" representation of the transmission of packets, each horizontal set of blocks representing the delays associated with each packet. The lower timing diagram illustrates a composite delay diagram, representing the causes of delay at the 'message level', as discussed further below.

In this example, each packet has the same size, and thus each packet has an equal bandwidth delay (B) and latency delay (L) allocated to occur at the end of the packet, per the default delay model discussed above. A first packet is illustrated as having a bandwidth delay B 310 and a latency delay L 311. The second packet is illustrated as being sent at substantially the same time as the first packet, similar to the transmission of the first two packets 121 of FIG. 1C (that is, for example, the first and second packet are placed in the transmit queue as part of a 'packet train', as illustrated by the initial condition of the transmit queue in the upper timing diagram). The initial time period 312 of the second packet, likely to be caused while waiting in a queue such as 220 in FIG. 2 for the first packet to be transmitted over the bottleneck 210, is identified as congestion C 312.

As illustrated in the upper timing diagram at 301, the transmission of the first two packets depletes the transmitter output queue, but the queue is immediately replenished by the third and fourth packets. The third and fourth packets are placed in the transmit queue immediately after the second packet's bandwidth delay B 313, while the second packet is traveling to the destination node (i.e. during the second packet's latency period L 314). The third packet is transmitted immediately, reducing the transmit queue at 302, and experiences its bandwidth delay B 315, during which time the fourth packet experiences a congestion delay C 316. The fourth packet's congestion delay C 316 extends beyond the third packet's bandwidth delay B 315, and therefore is likely caused by other traffic on the network. As illustrated in the upper timing diagram, at 303, the transmit queue contains data that is ready to be transmitted, but is stalled due to this congestion. At the end of this congestion period C 316, the fourth packet experiences its bandwidth delay B 317 as it travels across the bottleneck link, and the transmit queue is depleted, at 304.

From a message level viewpoint, at the lower timing diagram, the sequential and continuous transmission of the first three packets through the bottleneck link results in a bandwidth delay B 320, which is as short as the bottleneck link will allow for the amount of message data in the first three packets. Therefore, the packet congestion delay 312 and half of the packet congestion delay 316 is of no consequence to the transmission of the message. However, the remaining half of the congestion delay 316 is time during which the message data is not being transmitted through the bottleneck link, and therefore constitutes a congestion delay C 326 that is experienced by the message. When the fourth packet is being transmitted through the bottleneck link, with bandwidth delay B 317, the delay at the message level is attributable to this bandwidth delay, at B 327.

While the fourth packet is traveling to the destination node, and experiencing its latency delay 318, no data is present in the transmit queue, as illustrated at 305. This lull period may correspond, for example, to the period when the server B of FIG. 1C is waiting for the acknowledgement 125 from client A before sending the fifth and sixth packets. At the message level, this period of inactivity cannot be attributed to congestion or bandwidth delay, and therefore is attributed to the 'other'/'protocol' delay category X 328. Note that although the fourth packet is still propagating to its destination, as indicated by the latency 318, this period of delay 328 is not considered to be attributable to 'latency' at the message level because this latency delay is not 'causing' the delay at the message level. There must be some other cause of this delay, and because the cause does not appear to be related to latency, bandwidth, or congestion, the cause is most likely to be related to protocol.

The delay components of the subsequent packets are similarly analyzed to determine which delay effects are realized at the message level, as illustrated in the lower timing diagram of FIG. 3. Note that the latency effect L 390 is only attributed once to each message in a given direction, because this latency effectively corresponds to a 'time-shift' of all of the packets by the amount of time it takes for each bit of each packet to travel the (electrical) distance between the source and destination nodes. Unlike the bandwidth delay at the bottleneck, which does not allow for simultaneity, while each bit is traveling along the path to the destination (experiencing latency), other bits are simultaneously traveling at other points along the path to the destination.

Figure 4:
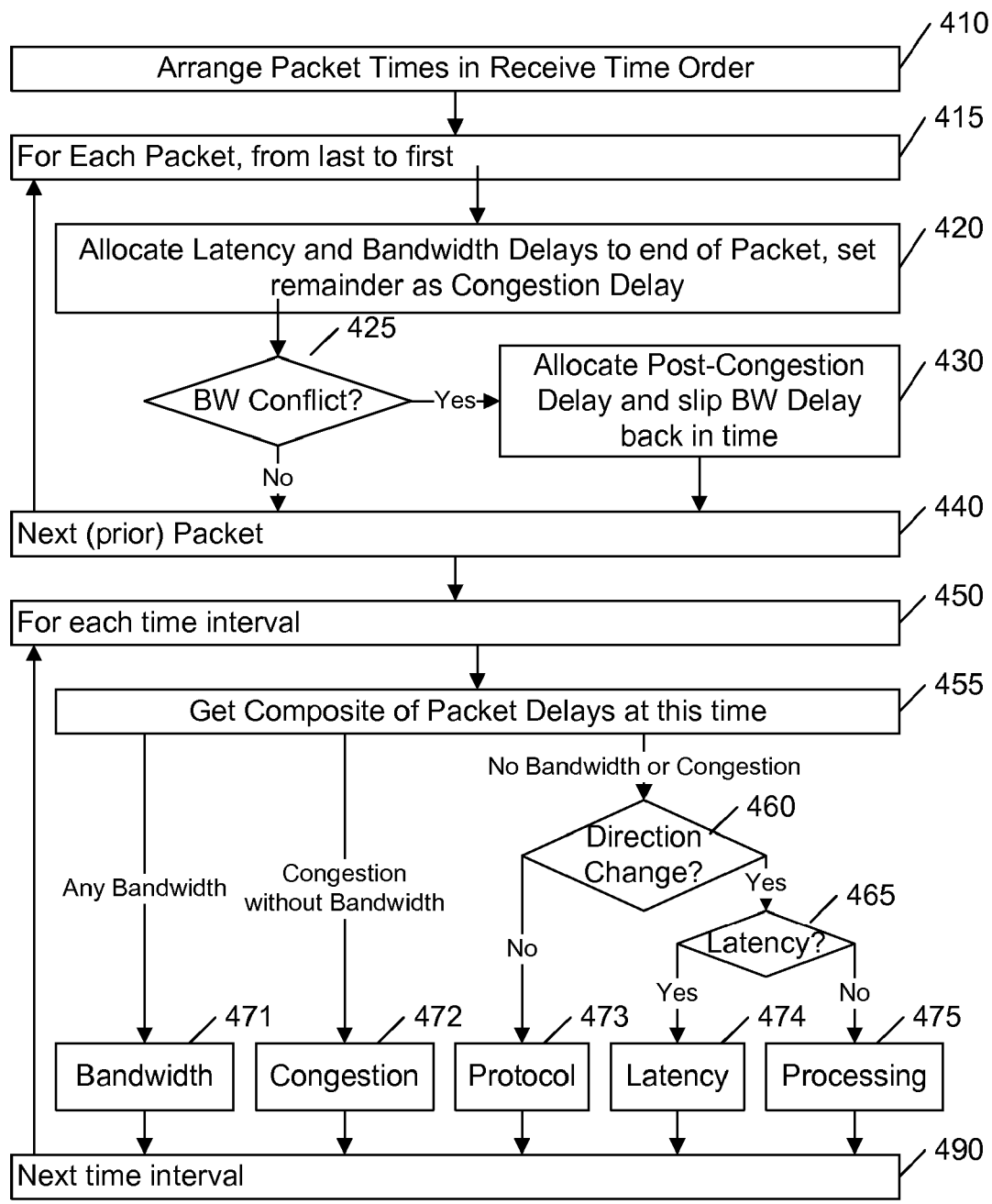
FIG. 4 illustrates an example flow diagram for determining delay components associated with a message path.

FIG. 4 illustrates an example flow diagram for determining which delays at the packet level are realized at the message level.

At 410, the packet time segments are arranged in receive-time order, and the loop 415-440 initializes the delay allocations in each of these packet segments. At 420, the latency delay is allocated to the end of the packet time segment, the bandwidth delay is allocated to occurring just prior to the latency delay, and any remaining time in the packet time segment is considered congested delay, as discussed above with regard to the default delay model.

At 425, a check is made to assure that the default delay model does not lead to a conflict wherein it appears that two packets are traveling across the bottleneck link and simultaneously experiencing a bandwidth delay. This conflict occurs whenever it appears that a packet is being received sooner after a prior packet than the bottleneck delay would allow. That is, for example, if the bandwidth delay of the later packet is two time units long, but it was received at the destination node within one time unit of the prior packet, some other phenomenon must be occurring to account for this apparent conflict. This other phenomenon is the previously mentioned post-bottleneck congestion delay that may occur after the bottleneck link, as modeled by the queue 230 in FIG. 2. If the prior packet is delayed in this queue 230 for a longer time period than the later packet, and communicated to the destination node via links that are likely to have more bandwidth than the minimum bandwidth bottleneck link 210, the later packet will arrive at the destination sooner than the bandwidth delay would imply. Therefore, if, at 425, the bandwidth delay of the current packet overlaps the bandwidth delay of the later (prior processed) packet, the bandwidth delay of the current packet is moved back from its default position immediately before the latency delay to eliminate the overlap, and the intervening gap is identified as post-congestion delay, at 430.

Having allocated the delays in each packet so as to avoid bandwidth conflicts, the resultant packet delay sequences are assessed to determine which delay effects will be realized at the message level, via the loop 450-490. This processing may be performed within the loop 415-440, as each packet is being processed, but the illustrated independent processing is provided for ease of understanding.

The loop 450-490 assesses the composite of all of the packet delays that are simultaneously occurring at each time interval, the time intervals preferably being delineated by the times at which the state of any packet delay changes, to facilitate efficient processing.

At 455, all of the packet delays occurring during the current time interval are assessed. If any of the packets are experiencing a bandwidth delay, the time interval is identified as corresponding to bandwidth delay, at 471. The only congestion that is realized at the message level, at 472, is packet congestion that occurs while no other packets are experiencing bandwidth delay traveling across the bottleneck link; i.e. the message is, in fact, being held up due to congestion and not merely bandwidth delay.

If no packets are experiencing congestion or bandwidth delay, the system is either waiting for a stream of packets to finish arriving (latency delay), or waiting while the packet stream, or other information, is being processed (processing delay), or waiting for some other reason, likely related to protocol (other/protocol delay). If the delay is experienced at the end of a message stream in a given direction, at 460, and the packets are still being received, as indicated by a packet latency delay, at 465, the delay is attributed to the latency of the message stream, at 474; at the end of the packet latency delay, at 465, any remaining delay is attributed to a processing delay, at 475. That is, with respect to the message flow of FIG. 1A, the message stream 103 must incur a latency delay as it travels the (electrical) distance between nodes B and A, and that delay must be incurred before node A can effect its processing 104 and subsequently transmitting message 105. After accounting for bandwidth delay 471, congestion delay 472, latency delay 474, and processing delay 475, any other delays that occur before the end of the message stream in a given direction are attributed to other/protocol delays, at 473.

Figure 5A:
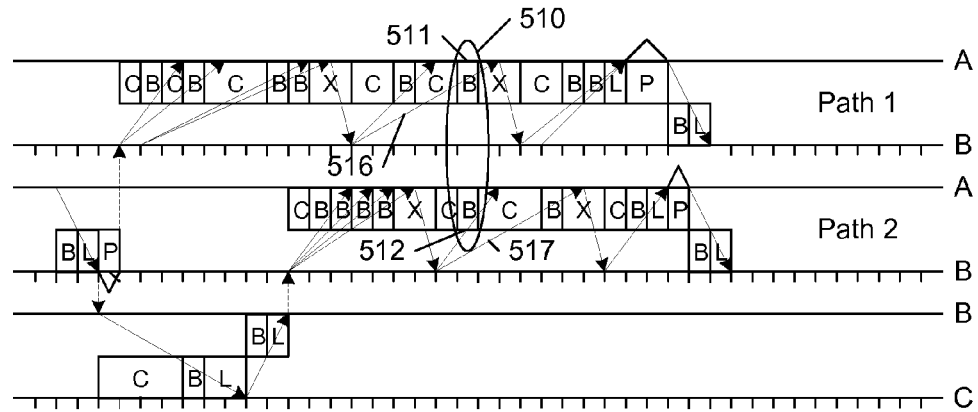
FIGS. 5A-5C illustrate an example analysis of packet delay components to identify cross-congestion and self-congestion.
Figure 5B:
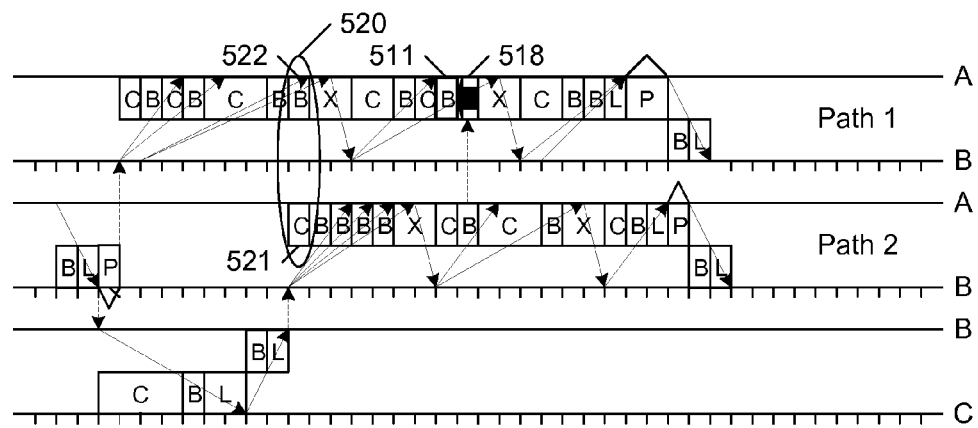
Figure 5C:
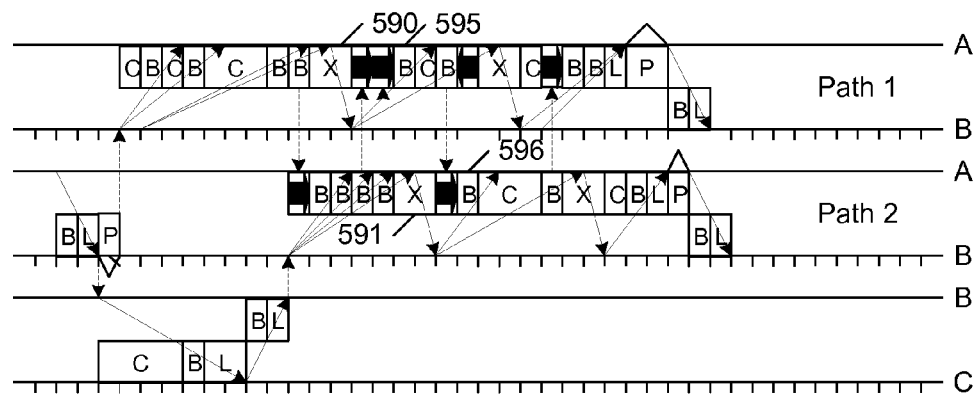

FIGS. 5A-5C illustrate further analysis of packet delays to identify each of the causes of delay in the application message sequences of FIG. 1A.

In FIG. 5A, the packet delays in each of the message paths are processed as detailed above to identify the delays that are realized at the message level. That is, each time interval is identified as being attributed to either latency (L), bandwidth (B), congestion (C), processing (P), or other/protocol (X) delay.

In accordance with an aspect of this invention, the allocation of delays among these causes is further analyzed to eliminate any resultant conflicts, and in doing so, further distinguish self-congestion and cross-congestion from network-congestion. Self-congestion and cross-congestion are self induced artifacts of the particular application, whereas network-congestion is caused by factors beyond the control of the application. The terms self-congestion and cross-congestion are used herein to identify two aspects of the congestion that is caused by the traffic generated or received by the application. As noted above, because two packets cannot simultaneously be transmitted over the bottleneck link, the congestion experienced by a packet of a message may be the result of a prior packet of the same message occupying the bottleneck link when this packet arrives.

Cross-congestion is akin to post-bottleneck congestion discussed above. At the encircled time period 510 in FIG. 5A, packets 511, 512 from each of the message paths are indicated as simultaneously experiencing bandwidth delay. Because two packets cannot be simultaneously traversing the bottleneck link, the earlier of the two packets 511, 512 must have traversed the link sooner than the independent processing of its message indicates. The bandwidth delay 511 is associated with packet 516, and the bandwidth delay 512 is associated with packet 517. Because packet 517 is transmitted significantly later than packet 516, it is assumed that packet 517 arrived at the bottleneck link later, and thus packet 516 must have already traversed the bottleneck when packet 517 arrived. As illustrated in FIG. 5B, the bandwidth delay 511 that is associated with packet 516 is moved back in time, and the time interval 518 is identified as a cross-congestion delay, illustrated by a 'back-arrow' symbol at that time interval. The moving back of bandwidth delay 511 merely results in a reduction in the attributed congestion delay before this delay 511. However, if the prior time interval indicated a bandwidth delay, this delay would also be moved back in time, and the process continues until the bandwidth delay is moved into an existing congestion or protocol delay time interval.

Self-congestion is congestion that appears to be created by the concurrent transmission of messages during an application sequence. The circled time period 520 in FIG. 5B illustrates a congestion delay 521 on path 2 while a packet of path 1 is experiencing a bandwidth delay 522. It is significant to note that even if there was no other traffic on the network during this time interval, the packets on path 2 would experience this congestion delay 522, because the packets could not be transmitted across the bottleneck link while the packet of path 1 was traversing this link. FIG. 5C illustrates a corresponding identification of each congestion time interval that is attributable to self-congestion delays, as indicated by a 'forward arrow' in each corresponding time interval.

Although this analysis is based on a number of assumptions and defaults to provide an estimate of the distribution of the different causes of delays, these estimates are particularly useful for effective network management and application development and support. For example, a typical 'correction' for excessive congestion delay may be to redistribute traffic along different routes in the network. If, however, this analysis indicates that a significant amount of the congestion delay is due to self-congestion, the application performance improvement from such a traffic redistribution can be expected to be significantly less than what might be expected if the application had very little self-congestion, and alternative corrections may be determined to be more promising, such as modifying the application to better distribute its traffic flow.

In accordance with another aspect of this invention, these determined delay parameters may be further used for identifying the potential areas for performance improvement by determining the effects of eliminating or reducing one or more of the delay categories. As will be recognized by one of skill in the art, the reduction or elimination of a particular delay category will, in general, not necessarily provide a corresponding reduction in the overall application delay time, due to the dependent nature of the interrelationships among delays. In FIG. 5C, for example, it may appear that the elimination of all of the other/protocol (X) delay would result in a four time-unit reduction in each path. However, it can be seen that the elimination of the other/protocol delays 590 or 591 will have no effect, because the bandwidth delays 595 and 596 cannot be moved back in time, due to self congestion. Conversely, removing or reducing another category of delay may also have the effect of reducing self-congestion, by changing the time that some of the packets arrive at the bottleneck, and thus have a greater-than-expected effect.

Because the above described process is able to distinguish congestion from protocol delays, and further can distinguish self-congestion and cross-congestion from network congestion, these interrelated effects can be determined/estimated. In a preferred embodiment of this invention, the originally determined self-congestion is removed, the proposed modification or elimination of other delays or delay categories are specified, and the resultant packet delays and realized message delays are re-determined, including the self-congestion delay.

Figure 6:
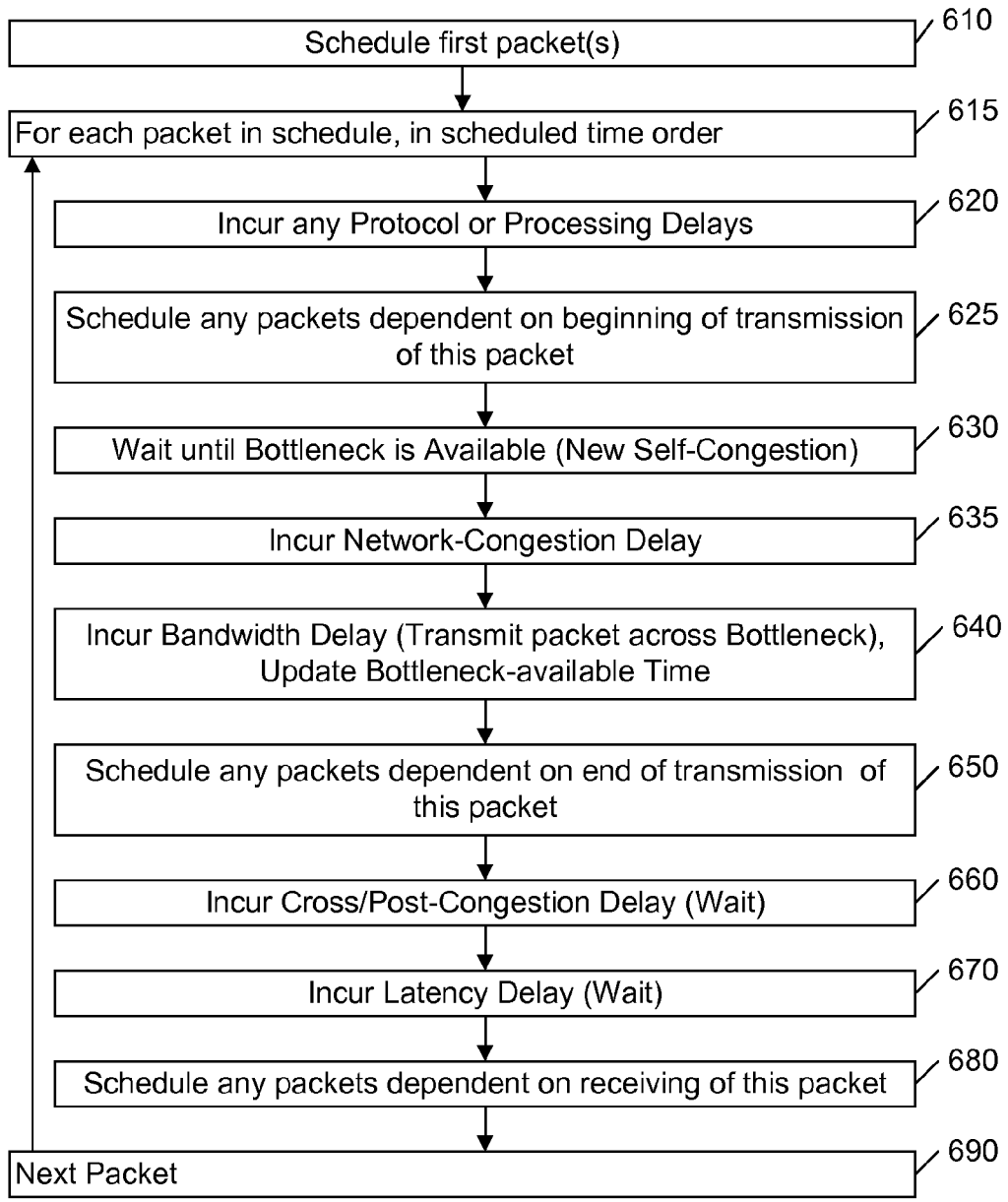
FIG. 6 illustrates an example flow diagram for determining application sequence timing parameters based on determined, estimated, or modified delay parameters.

FIG. 6 illustrates a flow diagram for determining packet delays using the determined and/or modified delay category parameters. In this processing, the sequence of events (delay elements) is maintained, with the exception of self-congestion, which is dynamically determined.

At 610 the packet(s) that start at the initial time is (are) scheduled. The loop 615-690 is configured to process each scheduled packet, in time order, adding dependent packets to the schedule as required.

A packet-clock is maintained during the processing of each packet, and is set to the scheduled time for the start of this packet when the packet is 'removed' from the schedule for processing at 615. The packet starts at its scheduled time, and initially waits (the packet-clock is advanced) for its associated protocol or processing delay, if any, at 620. This packet-clock time is the effective send time of this packet, and any packets that are dependent upon the sending of this packet are scheduled to start at this send time, at 625.

At 630, the packet waits (the packet-clock is advanced), if necessary, until the bottleneck link is available. As detailed below (640), as each packet in scheduled time order is transmitted over the bottleneck, the time at which the bottleneck is next available is updated. If the determined send time of this packet is before this bottleneck-available time, the time between the send time and the bottleneck-available time is the newly determined self-congestion delay. After incurring this self-congested delay, if any, the packet waits for its associated network-delay interval, if any, at 635.

At 640, the packet incurs its bandwidth delay (the packet-clock is advanced) as it is transmitted through the bottleneck link, and the bottleneck-available time is updated to the packet-clock time. If any packets are dependent upon the end of transmission of this packet, they are scheduled to commence at this time, at 650.

Any post-congestion delay that is associated with this packet is incurred, at 660, followed by the packet's latency delay, at 670. This resultant packet-clock time is the newly determined receive time of the packet, and any packets that are dependent on the packet being received are scheduled at this time, at 680.

At 690, if any packets are scheduled, the loop is repeated for the earliest scheduled packet, at 610.

Figure 7A:
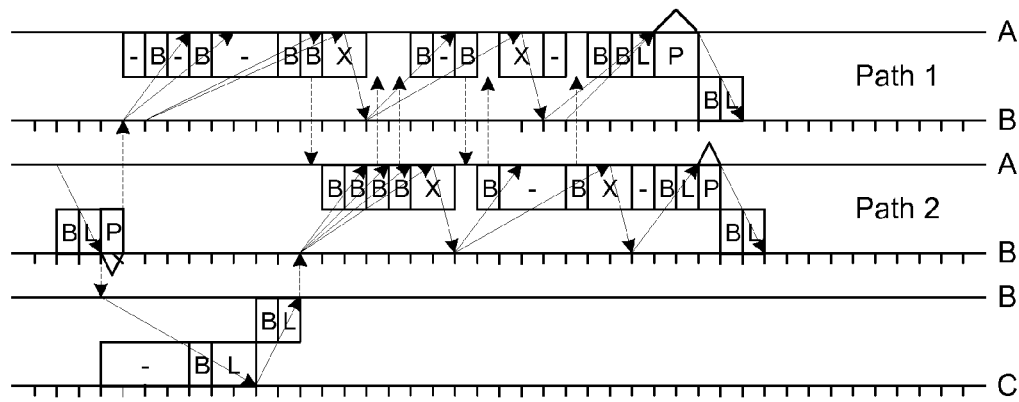
FIGS. 7A-7C illustrate an example determination of delay components for an application sequence based on determined and modified delay parameters.
Figure 7B:
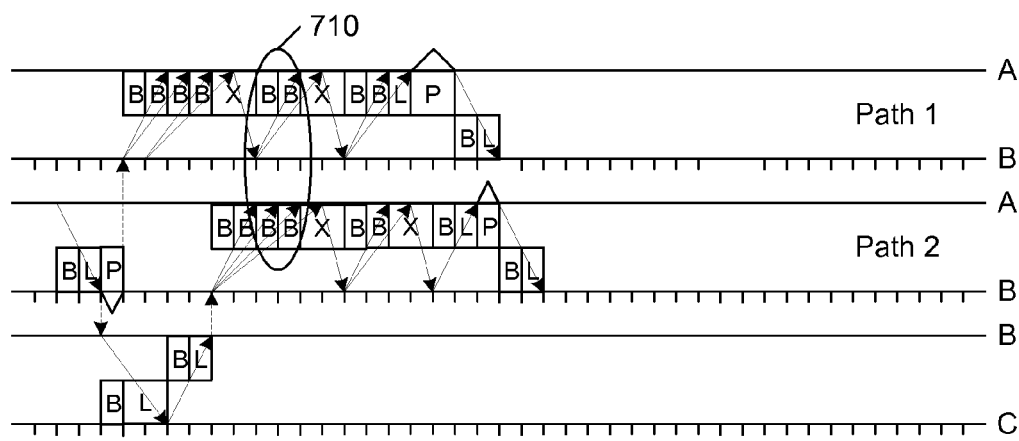
Figure 7C:
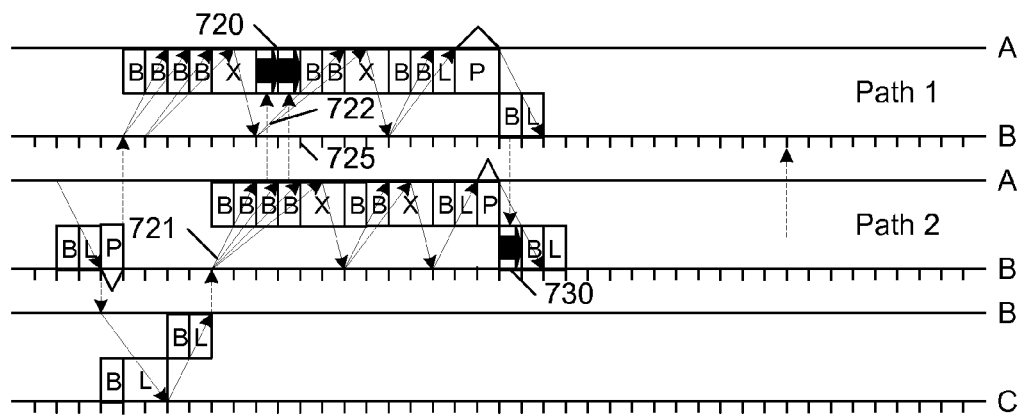

FIGS. 7A-7C illustrate an example application of the process of FIG. 6 for determining the resultant application delay if all network congestion is eliminated. One of skill in the art will recognize that a similar analysis could be performed for determining the effects of eliminating only the network-congestion delay between particular tiers, the effects of reducing the network-congestion delay in half, the effects of improving the bandwidth delay by a given percentage, and so on. Additionally, the effects of providing multiple improvements in parallel, such as increasing the bandwidth and reducing network-congestion, may also be determined.

FIG. 7A illustrates the determined application sequence with the self-congestion and network-congestion identified by a blank space and a dashed box ("-"), respectively. FIG. 7B illustrates the conventional/simple result of such an elimination.

As indicated by the encircled time intervals 710, however, an attempt to use the bottleneck link in path 1 before the prior-transmitted packets from path 2 have completed their transit results in self-congestion, and the bandwidth delays in the upper path must be delayed, as illustrated by the corresponding 'right arrow' symbols 720 in FIG. 7C. With regard to the flow-diagram of FIG. 6, the first four packets 721 in path 2 will be processed before the packet 722, and will set the bottleneck-available time to time-unit 725, at block 640. When packet 722 is processed, it will be forced to wait until (its packet-clock will be advanced to) this time 725, at block 630. As also illustrated in FIG. 7C, this time shift results in self-congestion 730 at server B.

As can be seen, the ability to distinguish self-congestion from network-congestion as taught herein can provide a greater insight and a generally more accurate determination of the causes of application delays, and the potential effects of possible network or application modifications.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may include a processor, and software portions may be stored on a computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A method of determining delay components of an application sequence comprising:

partitioning, on a network analysis system, the application sequence into a plurality of message paths, identifying, by the network analysis system, a set of packets corresponding to each message path, each packet having an associated set of packet delay components, determining, by the network analysis system, a set of message delay components corresponding to each message path, based on the sets of packet delay components associated with the message path, wherein the set of packet delay components includes a packet bandwidth delay, and determining the set of message delay components includes:

determining one or more occurrences of message bandwidth delay, based on occurrences of packet bandwidth delay in one or more of the sets of packet delay components associated with the message path, and determining one or more occurrences of message congestion delay, based on an absence of occurrences of packet bandwidth delay in one or more of the sets of packet delay components associated with the message path.

2. The method of claim 1, wherein determining the set of message delay components includes determining one or more occurrences of message self-congestion delay, based on a concurrent occurrence of message bandwidth delay in at least two message paths, and the method includes adjusting the set of message delay components corresponding to at least one of the at least two message paths based on the one or more occurrences of message self-congestion delay.

3. The method of claim 2, wherein determining the set of message delay components includes determining one or more occurrences of message cross-congestion delay, based on a concurrent occurrence of message bandwidth delay in at least two message paths, and the method includes adjusting the set of message delay components corresponding to at least one of the at least two message paths based on the one or more occurrences of message cross-congestion delay.

4. The method of claim 1, wherein the set of packet delay components includes a packet congestion delay, and determining the set of message delay components includes determining one or more occurrences of message protocol delay, based on an absence of occurrences of packet congestion delay and packet bandwidth delay associated with the message path.

5. The method of claim 1, wherein determining the set of message delay components includes determining one or more occurrences of message latency delay, based on a distance associated with the message path.

6. The method of claim 1, including determining the associated set of packet delay components for each packet based on a size of each packet and a minimum bandwidth associated with the corresponding message path.

7. The method of claim 6, wherein determining the associated set of packet delay components for each packet is also based on a distance traveled by the packet.

8. The method of claim 1, including displaying one or more of the sets of message delay components associated with one or more of the message paths.

9. The method of claim 1, including:

modifying one or more components of the determined sets of message delay components to produce a set of modified message delay components for each message path, adjusting a time of occurrence of the modified message delay components in each message path, determining one or more occurrences of message self-congestion delay, based on a concurrent occurrence of message bandwidth delay of the modified message delay components in at least two message paths, adjusting the set of modified message delay components corresponding to at least one of the at least two message paths based on the one or more occurrences of message self-congestion delay, and identifying one or more differences between the sets of message delay components and the sets of modified delay components.

10. The method of claim 9, including displaying one or more of the sets of modified message delay components associated with one or more of the message paths.

11. A method of determining delay components of an application sequence, comprising:

partitioning, by a network analysis system, the application sequence into one or more message paths;

identifying, by the network analysis system, a set of packets corresponding to each message path; and for each message path:

for each packet in the message path:

identifying a time of occurrence of a total packet delay associated with the packet, identifying a packet latency delay and a packet bandwidth delay within the total packet delay, and identifying a packet congestion delay within the total packet delay, corresponding to a difference between the total packet delay and a sum of the packet latency delay and the packet bandwidth delay; and for each time period in the application sequence:

identifying each of the total packet delays in the message path occurring at this time period, if any of the total packet delays include a packet bandwidth delay occurring at this time period, identify this time period as including a message bandwidth delay, and if none of the total packet delays include a packet bandwidth delay occurring at this time period, and any of the total packet delays include a packet congestion delay occurring at this time period, identify this time period as including a message congestion delay, and providing, by the network analysis system, a report based on one or more of the identified message congestion delays.

12. The method of claim 11, including adjusting a time of occurrence of one or more packet bandwidth delays based on a concurrent time of occurrence of packet bandwidth delays among two or more conflicting packets.

13. The method of claim 12, including identifying an ending time period corresponding to the packet latency delay of a last packet associated with an application message in the application sequence, and identifying the ending time period as including a message latency delay.

14. The method of claim 13, including identifying an interim time period between the ending time period and a start of a corresponding reply message in the application sequence, and identifying the interim time period as including a message processing delay.

15. The method of claim 14, including identifying each time period in the application sequence that has not been identified as including message congestion delay, message bandwidth delay, message latency delay, and message processing delay as including a message protocol delay.

16. The method of claim 12, including identifying a message time period associated with one or more messages of the application sequence, and identifying time periods in the message time period that have not been identified as including message congestion delay or message bandwidth delay as including a message protocol delay.

17. The method of claim 12, wherein adjusting the time of occurrence includes identifying a time interval corresponding to the adjusting as including an application induced congestion delay.

18. The method of claim 17, including identifying a concurrent period of occurrence of message bandwidth delay in a first message path and message congestion delay in one or more other message paths, and identifying the concurrent period in the one or more other message paths as also including application induced congestion delay.

19. The method of claim 18, including identifying each time period that includes a message congestion delay and does not include a message induced congestion delay as including a network congestion delay.

20. The method of claim 11, including identifying a concurrent period of occurrence of message bandwidth delay in a first message path and message congestion delay in one or more other message paths, and identifying the concurrent period in the one or more other message paths as including application induced congestion delay.

21. The method of claim 20, including identifying each time period that includes a message congestion delay and does not include a message induced congestion delay as including a network congestion delay.

22. A method of determining one or more effects of modifying delays in an application sequence, comprising:
identifying, by a network analysis system, a first sequence of message delay components in each message path of the application sequence, the message delay components including at least a network congestion delay, a self congestion delay, and a message bandwidth delay;
modifying, by the network analysis system, one or more of the message delay components in the first sequence of each message path and correspondingly adjusting a time of occurrence of the message delay components to provide a contiguous second sequence of message delay components in each message path;
determining, by the network analysis system, occurrences of self congestion delay in the second sequence of message delay components in each message path and correspondingly adjusting a time of occurrence of the message delay components to provide a contiguous third sequence of message delay components in each message path based on the occurrences of self congestion delay; and
identifying, by the network analysis system, one or more differences between the first sequence of message delay components and the second sequence of message delay components of at least one message path.

23. The method of claim 22, wherein modifying the one or more message delay components in the first sequence includes automatically removing occurrences of self congestion delay.

24. The method of claim 22, wherein the message delay components also include a message latency delay and a message protocol.

25. The method of claim 24, wherein the message delay components also include a message processing delay.

26. The method of claim 22, wherein each message in each message path of the application sequence includes one or more packets, each packet having associated occurrences of packet bandwidth delay and packet congestion delay; and determining occurrences of self congestion delay includes determining periods of concurrent occurrences of packet bandwidth delay in a first message path and packet congestion delay in one or more second message paths.

27. A computer program stored on a non-transitory computer readable medium that, when executed, causes a processor to effect a process comprising:
partitioning an application sequence into a plurality of message paths,
identifying a set of packets corresponding to each message path, each packet having an associated set of packet delay components,
determining a set of message delay components corresponding to each message path, based on the sets of packet delay components associated with the message path,
wherein
the set of packet delay components includes a packet bandwidth delay, and
determining the set of message delay components includes:
determining one or more occurrences of message bandwidth delay, based on occurrences of packet bandwidth delay in one or more of the sets of packet delay components associated with the message path, and
determining one or more occurrences of message congestion delay, based on an absence of occurrences of packet bandwidth delay in one or more of the sets of packet delay components associated with the message path.

28. The program of claim 27, wherein determining the set of message delay components includes determining one or more occurrences of message self-congestion delay, based on a concurrent occurrence of message bandwidth delay in at least two message paths, and the process includes adjusting the set of message delay components corresponding to at least one of the at least two message paths based on the one or more occurrences of message self-congestion delay.

29. The program of claim 28, wherein determining the set of message delay components includes determining one or more occurrences of message cross-congestion delay, based on a concurrent occurrence of message bandwidth delay in at least two message paths, and the process includes adjusting the set of message delay components corresponding to at least one of the at least two message paths based on the one or more occurrences of message cross-congestion delay.

30. The program of claim 27, wherein the set of packet delay components includes a packet congestion delay, and determining the set of message delay components includes determining one or more occurrences of message protocol delay, based on an absence of occurrences of packet congestion delay and packet bandwidth delay associated with the message path.

31. The program of claim 27, wherein the process includes displaying one or more of the sets of message delay components associated with one or more of the message paths.

32. The program of claim 27, wherein the process includes:
modifying one or more components of the determined sets of message delay components to produce a set of modified message delay components for each message path,
adjusting a time of occurrence of the modified message delay components in each message path,
determining one or more occurrences of message self-congestion delay, based on a concurrent occurrence of message bandwidth delay of the modified message delay components in at least two message paths, adjusting the set of modified message delay components corresponding to at least one of the at least two message paths based on the one or more occurrences of message self-congestion delay, identifying one or more differences between the sets of message delay components and the sets of modified delay components, and displaying one or more of the sets of modified message delay components associated with one or more of the message paths.

33. The program of claim 27, wherein determining the one or more occurrences of message bandwidth delay and message congestion delay includes:

for each message path:

for each packet in the message path:

identifying a time of occurrence of a total packet delay associated with the packet, identifying a packet latency delay and a packet bandwidth delay within the total packet delay, and identifying a packet congestion delay within the total packet delay, corresponding to a difference between the total packet delay and a sum of the packet latency delay and the packet bandwidth delay; and for each time period in the application sequence:

identifying each of the total packet delays in the message path occurring at this time period, if any of the total packet delays include a packet bandwidth delay occurring at this time period, identify this time period as including a message bandwidth delay, and if none of the total packet delays include a packet bandwidth delay occurring at this time period, and any of the total packet delays include a packet congestion delay occurring at this time period, identify this time period as including a message congestion delay.

34. The program of claim 33, wherein the process includes adjusting a time of occurrence of one or more packet bandwidth delays based on a concurrent time of occurrence of packet bandwidth delays among two or more conflicting packets.

35. The program of claim 34, wherein the process includes:

identifying an ending time period corresponding to the packet latency delay of a last packet associated with an application message in the application sequence, and identifying the ending time period as including a message latency delay, identifying an interim time period between the ending time period and a start of a corresponding reply message in the application sequence, and identifying the interim time period as including a message processing delay, and identifying each time period in the application sequence that has not been identified as including message congestion delay, message bandwidth delay, message latency delay, and message processing delay as including a message protocol delay.

36. The program of claim 33, wherein the process includes:

identifying a message time period associated with one or more messages of the application sequence, and identifying time periods in the message time period that have not been identified as including message congestion delay or message bandwidth delay as including a message protocol delay.

37. The program of claim 33, wherein the process includes:

identifying a concurrent period of occurrence of message bandwidth delay in a first message path and message congestion delay in one or more other message paths, and identifying the concurrent period in the one or more other message paths as including application induced congestion delay, and identifying each time period that includes a message congestion delay and does not include a message induced congestion delay as including a network congestion delay.

38. A computer program stored on a non-transitory computer readable medium that, when executed, causes a processor to determine one or more effects of modifying delays in an application sequence by effecting a process comprising:

identifying a first sequence of message delay components in each message path of the application sequence, the message delay components including at least a network congestion delay, a self congestion delay, and a message bandwidth delay;

modifying one or more of the message delay components in the first sequence of each message path and correspondingly adjusting a time of occurrence of the message delay components to provide a contiguous second sequence of message delay components in each message path;

determining occurrences of self congestion delay in the second sequence of message delay components in each message path and correspondingly adjusting a time of occurrence of the message delay components to provide a contiguous third sequence of message delay components in each message path based on the occurrences of self congestion delay; and identifying one or more differences between the first sequence of message delay components and the second sequence of message delay components of at least one message path.

39. The program of claim 38, wherein modifying the one or more message delay components in the first sequence includes automatically removing occurrences of self congestion delay.

40. The program of claim 38, wherein each message in each message path of the application sequence includes one or more packets, each packet having associated occurrences of packet bandwidth delay and packet congestion delay; and determining occurrences of self congestion delay includes determining periods of concurrent occurrences of packet bandwidth delay in a first message path and packet congestion delay in one or more second message paths.

* * * * *